United States Patent
Finkler

(10) Patent No.: US 6,992,476 B2
(45) Date of Patent: Jan. 31, 2006

(54) TRANSMITTER SYSTEM FOR A FERRARIS MOTION TRANSMITTER

(75) Inventor: Roland Finkler, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 60 days.

(21) Appl. No.: 10/477,669

(22) PCT Filed: Apr. 26, 2002

(86) PCT No.: PCT/DE02/01544

§ 371 (c)(1),
(2), (4) Date: Nov. 12, 2003

(87) PCT Pub. No.: WO02/093179

PCT Pub. Date: Nov. 21, 2002

(65) Prior Publication Data

US 2004/0145363 A1  Jul. 29, 2004

(30) Foreign Application Priority Data

May 11, 2001  (DE) ................................ 101 22 872

(51) Int. Cl.
G01P 3/46 (2006.01)
G01P 3/52 (2006.01)
(52) U.S. Cl. ................. 324/164; 73/514.31; 73/514.39
(58) Field of Classification Search ................ 324/164, 324/160, 162, 163, 173, 174, 175, 176, 177, 324/207.11, 207.25, 207.24, 207.2, 207.19; 73/488, 514.31, 514.39, 519.01, 520.01; 322/31
See application file for complete search history.

(56) References Cited

U.S. PATENT DOCUMENTS

| | | | | |
|---|---|---|---|---|
| 1,929,259 A | * | 10/1933 | Rich | 324/76.69 |
| 2,090,521 A | * | 8/1937 | Serrell | 361/238 |
| 2,460,115 A | | 1/1949 | Adamson | |
| 3,932,813 A | * | 1/1976 | Gallant | 324/164 |
| 4,095,177 A | | 6/1978 | Harris | |
| 5,367,257 A | * | 11/1994 | Garshelis | 324/207.22 |
| 5,467,654 A | * | 11/1995 | Chew et al. | 73/514.39 |
| 5,471,106 A | * | 11/1995 | Curtis et al. | 310/90.5 |
| 6,282,961 B1 | * | 9/2001 | D'Amico et al. | 73/514.39 |
| 6,462,535 B1 | * | 10/2002 | Schwabe | 324/164 |

FOREIGN PATENT DOCUMENTS

| | | |
|---|---|---|
| DE | 37 30 841 A1 | 3/1988 |
| FR | 1 232 969 A | 10/1960 |
| WO | WO 97/14968 A | 4/1997 |

OTHER PUBLICATIONS

"Aufnehmer zur Messung schnell veränderlicher Drehbeschleunigungen und Drehmomente" (*Sensor for measuring rapidly changing rotation accelerations and torques*), A. Denne, H. Rausch and W. Freise, Technisches Messen 48th year 1981, vol. 10, pp. 339 to 342.

* cited by examiner

Primary Examiner—Bot Ledynh
Assistant Examiner—Kenneth J. Whittington
(74) Attorney, Agent, or Firm—Henry M. Feiereisen

(57) ABSTRACT

A highly simply technical transmitter system for a Ferraris movement transmitter, wherein several magnetic field generators (M1,M2,M3) form at least one magnetic circuit with a moveable, non-magnetic electrically conducting rotating measuring body and speed-dependent or acceleration-dependent output signals can be generated by means of magnetic field sensors coupled thereto, embodied in such a way that a preferably cylindrical device shaft (W1,W2,W3) is provided as a measuring body.

9 Claims, 2 Drawing Sheets

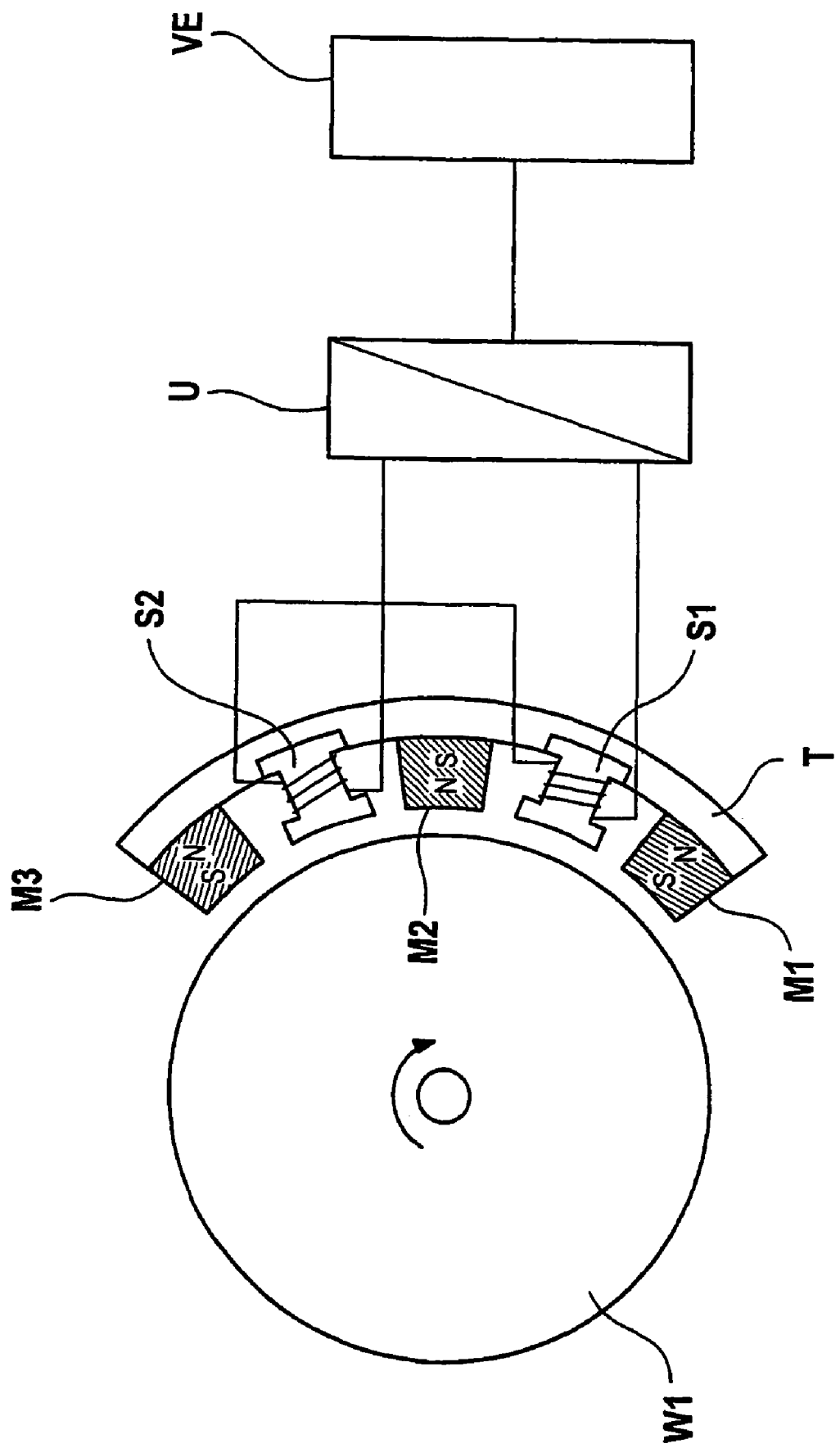

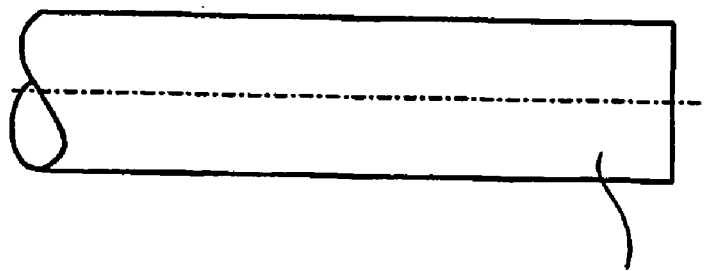
FIG 2    W1
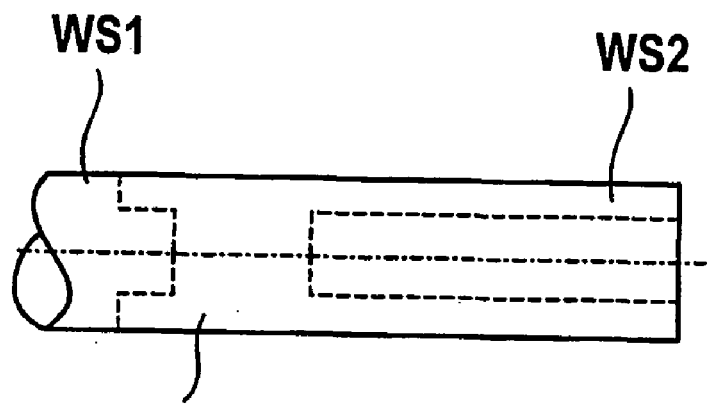
FIG 3
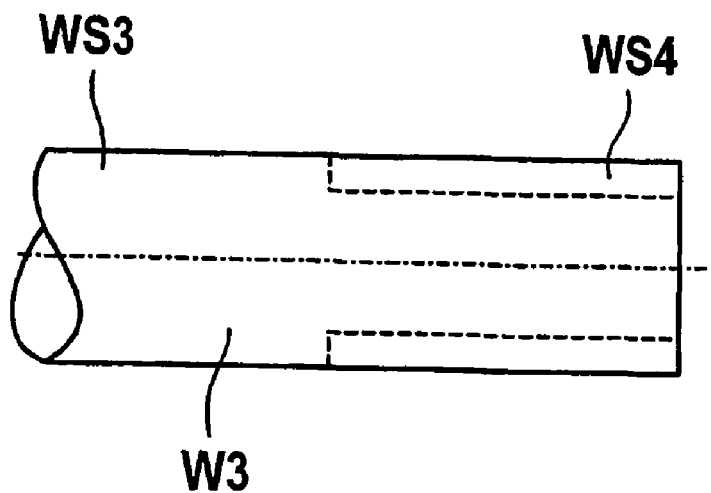
FIG 4

TRANSMITTER SYSTEM FOR A FERRARIS MOTION TRANSMITTER

BACKGROUND OF THE INVENTION

The invention relates to a transmitter system for a Ferraris motion transmitter, wherein one or several magnetic field generators together with a moving, electrically conducting rotating measuring body form at least one magnetic measurement assembly, whereby output signals can be generated by magnetic field sensors coupled thereto, the output signals depending on the rotation speed or rotation acceleration. Such transmitter systems on known, for example, from the publication "Aufnehmer zur Messung schnell veränderlicher Drehbeschleunigungen und Drehmomente" (Sensor for measuring rapidly changing rotation accelerations and torques), A. Denne, H. Rausch and W. Freise, Technisches Messen $48^{th}$ year 1981, Vol. 10, pages 339 to 342. The rotating measuring body is herein implemented as a drag cup. Another transmitter system of this type is known from DE 37 30 841 A1, wherein the rotating measuring body is a disk. If such transmitter systems are to be used to measure the rotation speed or rotation acceleration of a motor, preferably of an electric motor, then the measuring body that is specifically adapted to the transmitter system always has to be attached to the shaft.

Not only the measuring body therefore represents a specific component, but a specifically adapted joining technique with the corresponding device shaft is also required. The connection between the measuring body and the shaft can hereby cause erroneous measurement results if the stiffness is insufficient. A potential play between the rotating measuring body and the stationery components of the transmitter system also has to be taken into consideration with conventional solutions. Such play can be caused, for example, in that the symmetry axis of the measuring body cannot be brought into exact alignment with the shaft and/or that the measuring body is not completely rotationally symmetric.

Any existing play can adversely affect the distance, so that the distance cannot be made arbitrarily small and larger overall geometric dimensions of the system has to be accepted. This also results in longer time constants and hence a poorer dynamic characteristic. A larger distance also reduces the sensitivity of the sensor.

SUMMARY OF THE INVENTION

It is an object of the invention to design a transmitter system of the aforedescribed type so that a high-quality measurement characteristic can be achieved with a reduced technical complexity.

According to the invention, this is achieved with a transmitter system of the aforedescribed type in that a preferably cylindrical device shaft is provided as a measuring body, wherein the device shaft is preferably a device shaft whose motion is to be measured. The inventor has observed that it is possible to completely move away from specially designed measuring bodies, because the conventional device shafts can assume the function of the measuring body. This observation is even more surprising, since such simple design has never been proposed in spite of the long-established sensor technique that employs the Ferraris principle.

The device shaft does not necessarily need to be solid, but can also be implemented as a hollow shaft. Of course, the device shaft can in principle also be formed in several sections.

Advantageously, the standard shaft of an electric motor can form the device shaft, which embraces the most frequent application.

According to an advantageous embodiment of the invention, the elements of the transmitter system required in addition to the rotating measuring body can have a simple configuration in that two outer magnetic field generators are placed on the two free ends of a support body which at least partially encircles the device shaft, with a central magnetic field generator being arranged on the support body between the two outer magnetic field generators, that a corresponding magnetic field sensor is arranged on the support body between the outer magnetic field generators and the central magnetic field generator, and that magnetic field generators and sensors with predetermined air gap spacings are oriented towards the device shaft. If the support body completely encircles the device shaft, then an "outer" magnet can be eliminated, with the "free" ends being joined.

A less complex solution for such transmitter system can be implemented by providing permanent magnets as magnetic field generators and anti-serially connected coils as magnetic field sensors. In this case, the rotation acceleration is measured. The anti-serial connection eliminates interferences caused by ambient magnetic fields. If the rotation speed is to be measured instead of the rotation acceleration, then this can be accomplished by using commercially available elements, for example, permanent magnets as magnetic field generators and Hall sensors as magnetic field sensors. Alternatively, electromagnets that are controllably modulated can be used as magnetic field generators and Hall sensors or anti-serially connected coils can be used as magnetic field sensors.

If AC-excited coils or electromagnets are employed as magnetic field generators, then the sensor output signals is an AC voltage with the same frequency as the excitation voltage. The voltage amplitude is proportional to the rotation speed.

A particularly play-free arrangement is obtained by supporting the device shaft in a bearing and connecting the elements of the transmitter system rigidly with the bearing. This is improved by smaller spacings.

BRIEF DESCRIPTION OF THE DRAWING

Embodiments of the invention are illustrated in the drawing and will be described hereinafter in more detail. It is shown in:

FIG. 1 a first transmitter system,

FIGS. 2, 3 and 4 alternative embodiments of the measuring body.

DETAILED DESCRIPTION OF PREFERRED EMBODIMENTS

The diagram of FIG. 1 shows the transmitter system for a Ferraris motion transmitter, whereby a cylindrical shaft W1, for example the motor shaft of an electric motor (not shown for sake of clarity), rotates in a direction indicated by the curved arrow about an axis designated with the reference symbol x. The shaft W1 consists here of an electrically conducting, non-magnetic material.

A support body T made of soft iron is arranged in segments around the shaft W1, which has at each of its free ends a corresponding permanent magnet M1 and M3, respectively, whereby the North poles "N" of the permanent magnets M1 and M3 face the support body T, whereas the South poles "S" of the permanent magnets M1 and M3 face the surface of the shaft W1. A third permanent magnet is arranged on the support body T between the permanent magnets M1 and M2 so that the South pole "S" of this permanent magnet M2 face the support body T, whereas the North pole "N" of this permanent magnet M2 is oriented towards the shaft W1. The permanent magnets M1 to M3 operate as magnetic field generators, whereas the coils S1 and S2 operate as magnetic field sensors. These coils S1 and S2 are also attached to the support body T and are located between the permanent magnets M1 and M2, and M2 and M3, respectively. The coils S1 and S2 are connected anti-serially in order to eliminate interfering ambient fields, and apply signals to a converter U that generates from the received signals an output signal that corresponds to the acceleration of the shaft W1. This signal is then transmitted to a processing device VE.

If the rotation speed of a shaft, for example of the shaft W1, is to be measured rather than the rotation acceleration, then sensors operating according to the Hall principle could be used instead of the coils S1 and S2. Alternatively or in addition, modulated electromagnets, i.e. coil assemblies, could be used instead of the permanent magnets M1 to M3.

The diagram of FIG. 2 shows a side view of the shaft W1 indicating the cylindrical shape of the shaft W1. However, the invention can in principle also be implemented with a conical or slightly curved shaft end.

Referring now to FIG. 3, the dashed line shown on the right section of the diagram indicates that a hollow cylinder could be employed instead of cylinders, for example for the shaft W2. On the other hand, the dotted line on the left side shows that the shaft W2 can also be constructed from segments arranged in the axial direction. Shown here are two consecutively arranged shaft segments WS1 and WS2 which can be connected in many ways, for example by a press fit.

The diagram of FIG. 4 shows a shaft W3, which can also consists of segments, in this case of shaft segments WS3 and WS4, which unlike in the aforedescribed embodiments where the shaft segments arranged in the axial direction, are here arranged instead in the radial direction. A shaft segment WS4 in the form of a hollow shaft can then be supported on the shaft segment WS3 disposed at the end of the shaft W3. An electrically insulating hollow cylinder can be placed between the shaft segments WS3 and WS4. This further reduces the susceptibility of the measurement system against interferences.

However, the end position is not absolutely necessary, and a position with an axial displacement can be employed. Moreover, the shaft diameter does not have to be identical over the entire length of the shaft. Modifications of the rotation sensor, in particular in the transmitter region, are feasible not only in the negative direction, as shown in FIG. 4, but in principle also in the positive direction.

What is claimed is:

1. A transmitter system for a Ferraris motion transmitter, comprising:
    an electrically conducting, rotating device shaft; and
    at least one magnetic measurement assembly which comprises an arcuate support structure segment which only partially encompasses the device shaft with an angle of less than 180° and which includes two outer magnetic field generators and a center magnetic field generator being arranged on the support structure between the two outer magnetic field generators; and
    two magnetic field sensors which generate an output signal that depends on the rotation speed or rotation acceleration of the rotating device shaft, with one of the two magnetic field sensors located on the support structure between one of the outer magnetic field generators and the center magnetic field generator and the other magnetic field sensor located on the support structure between the other outer magnetic field generator and the center magnetic field sensor, said magnetic field generators and said sensors oriented towards the rotating device shaft and having predetermined air gap spacings from the rotating device shaft.

2. The transmitter system of claim 1, wherein the device shaft comprises a hollow shaft.

3. The transmitter system of claim 1, wherein the device shaft comprises a multi-element shaft.

4. The transmitter system of claim 1, wherein the device shaft comprises a shaft of an electric motor.

5. The transmitter system of claim 1, wherein at least one of the outer and center magnetic field generators comprises a permanent magnet and that the magnetic field sensors comprise anti-serially connected coils.

6. The transmitter system of claim 1, wherein the magnetic field generators comprise permanent magnets and the magnetic field sensors comprise Hall sensors.

7. The transmitter system of claim 1, wherein the magnetic field generators comprise electromagnets that are controllably modulated and the magnetic field sensors comprise anti-serially connected coils.

8. The transmitter system of claim 1, wherein the device shaft is rotatably supported by a bearing and the at least one magnetic measurement assembly is fixedly connected with the bearing.

9. The transmitter system of claim 1, wherein the center magnetic field generator is installed on the support structure segment so that the magnetic pole of the center magnetic field generator facing the rotating device shaft is of opposite polarity with respect to the magnetic poles of the outer magnetic field generators facing the rotating device shaft.

* * * * *